United States Patent Office 3,679,432
Patented July 25, 1972

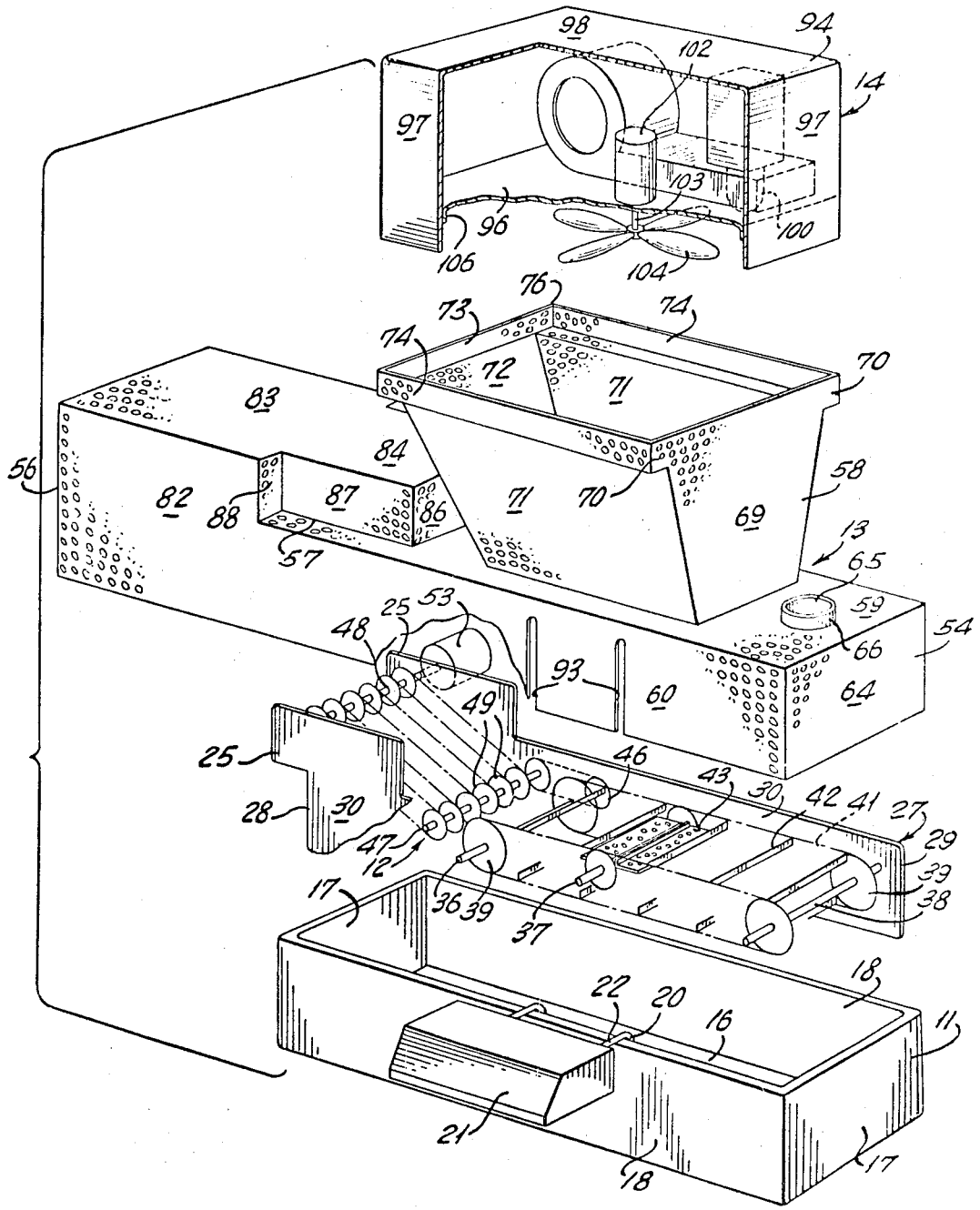

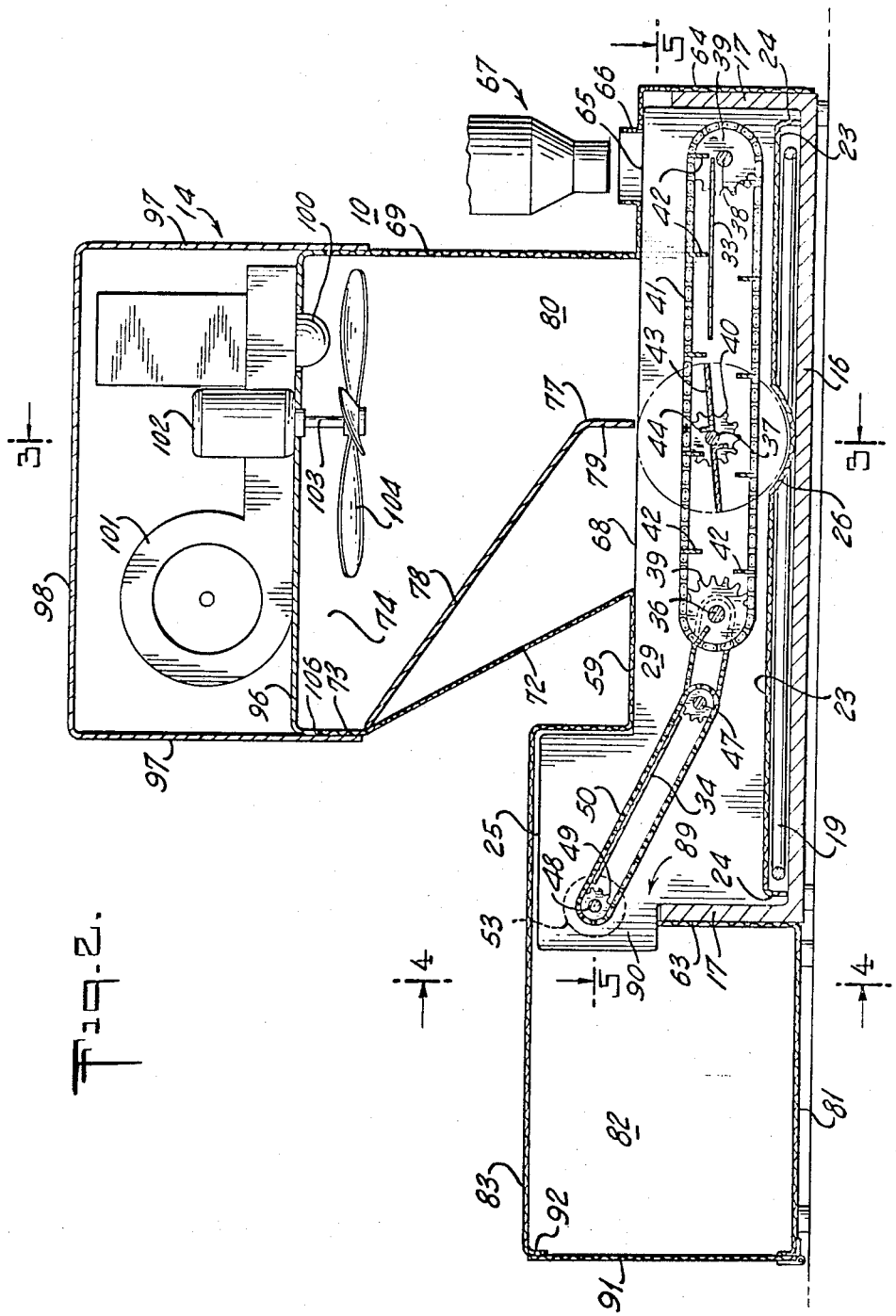

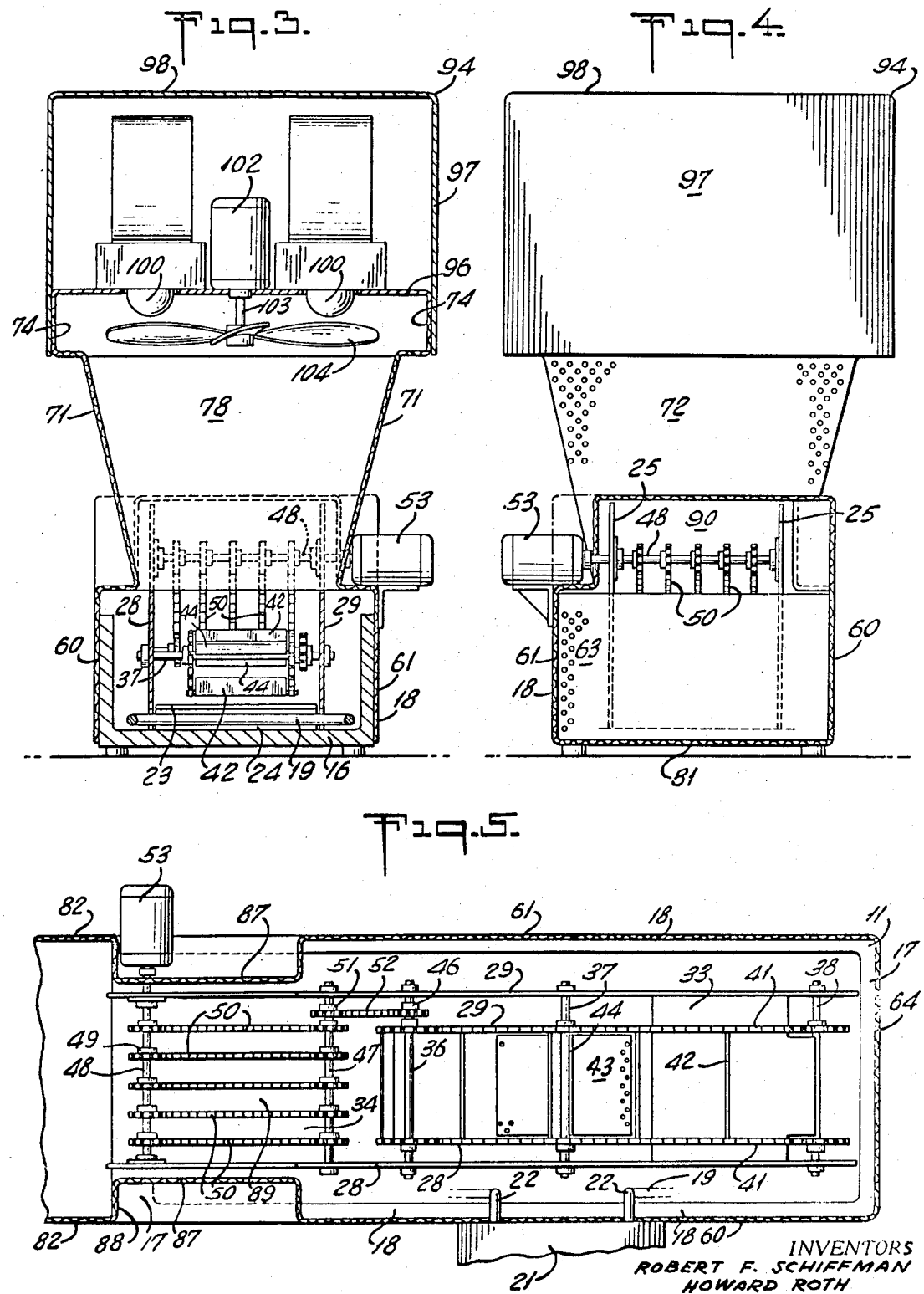

---

3,679,432
METHOD OF PRODUCING COOKED PRODUCTS
Robert F. Schiffmann, Brooklyn, Howard Roth, Bronx, David H. Lipka, Roslyn, and Abraham H. Goodman, Great Neck, N.Y., assignors to DCA Food Industries Inc., New York, N.Y.
Continuation-in-part of application Ser. No. 519,255, Jan. 7, 1966. This application Aug. 17, 1970, Ser. No. 64,218
Int. Cl. A21d 13/0, 13/08
U.S. Cl. 99—86
15 Claims

ABSTRACT OF THE DISCLOSURE

A fried bakery product, such as a chemically leavened and extruded doughnut, is produced by first totally immersing a piece of dough for the fried product in an edible frying medium at a frying temperature wherein the edible frying medium is liquid and for a time sufficient to assure proper shaping of the dough piece. Thereafter, the dough piece, while partially immersed in the frying medium, is subjected to microwave energy concurrent with frying of the underside thereof. The fried product is completed by inverting the same in the frying medium.

---

The present invention relates generally to the production of comestibles and, in particular, to an improved method for the production of fried cakes, such as doughnuts and the like. This is a continuation-in-part of U.S. application Ser. No. 519,255, filed Jan. 7, 1966 in the name of Robert F. Schiffmann et al. for "Method of Producing Cooked Products and Apparatus Therefor" and now abandoned.

The conventional method of cooking doughnuts requires that a cut and shaped piece of doughnut dough be dropped into hot fat in which it remains submerged for from 2 to 10 seconds, after which the piece will float to the surface with a portion thereof out of the fat. As is generally understood, this total immersion of the cut and shaped piece of doughnut dough causes the formation of a shape-retention skin thereon which assures that the dough, after being cooked in the frying fat, will expand properly. If the submersion is of too short a time, there is a tendency for the dough when cooked to misshape, for example, to expand too much in the lateral direction, causing the final product to appear flattened and ringy and to have an oversized hole in the center thereof. With the presence of an appropriate shape-retention skin, desirable lateral and height proportions will be established during expansion and usually the hole size will decrease and change the shape of the contiguous wall into a star-shaped configuration. Commonly, such a doughnut is referred in the trade as a "blooming doughnut."

If the total submergence period is too long, that is, in excess of 10 seconds, the shape-retention skin becomes a crust which will significantly reduce the expandability of the dough during the remainder of the frying. As long as the total submergence phase of the cooking lies between 2 and 10 seconds, the half of the dough which floats above the level of the fat is still expandable within the shape-retention skin. Although some doughnuts and other fried cake products are cooked completely by forcing the product to be submerged for the entire cooking time, most doughnut products are cooked in two parts, that is, the lower part of the doughnut remaining below the surface of the fat after the initial total submergence is fried for 40 to 60 seconds and then the unfinished doughnut is turned over so that the uncooked upper part that was floating above the surface of the fact is submerged. This second phase of cooking again takes from 40 to 60 seconds for completion of the cooking process. This latter method of cooking is preferred even though it takes from 80 to 120 seconds as compared to 60 to 80 seconds for totally submerged cooking because many favorable product characteristics can be obtained. These characteristics include texture and thickness of the crust, texture and appearance of the crumb and shaping characteristics, such as the formation of a star-shaped hole in the doughnut characteristic of the blooming doughnut. A most important characteristic effected, however, is the size or volume of product per unit weight of dough used. The two-part cooking method can produce 50% more volume per unit weight of dough than can be produced by the totally submerged cooking method.

Even though the two-part cooking method is a distinct improvement over the method in which the comestible is totally submerged, it has the drawback of requiring up to two times the frying time and therefore, the use of very large frying vessels and large quantities of fat to fill them for high production. This is an important disadvantage since in most commercial bakeries space is at a premium. Likewise of importance is the fact that the chemical nature of fat and the conditions under which it is used require that it be consumed, that is, removed by the product, and replaced with fresh unused fat at a rate of not less than 30% of the total fat capacity of the vessel for seven hours of production, otherwise fat oxidation products will accumulate to excessive levels and be deleterious to the quality of the fried product.

In addition to the above drawbacks, the conventional cake frying procedures possess many other important disadvantages. The fried cakes, even when produced by the two-part frying method, do not have a specific volume which approaches the theoretically available specific volume for the specific dough employed, the cakes are not uniform in their physical characteristics and appearances, close process control must be observed, and the conventional cake frying processes otherwise leave much to be desired.

It is, therefore, a principal object of the present invention to provide an improved method for the production of comestibles.

Another object of the present invention is to provide an improved method for the cooking of dough in the production of fried cakes such as doughnuts and the like.

Still another object of the present invention is to provide an improved method for the production of fried cakes in which the cooking time is greatly reduced and the capacity of the related processing apparatus, relative to its size, is greatly increased.

A further object of the present invention is to provide an improved method for the production of fried cakes wherein the volume of cooking oil employed in the apparatus relative to the oil consumption is greatly reduced thereby reducing the production of undesirable oxidation products.

Still a further object of the present invention is to provide an improved fried cake cooking method wherein a maximum specific volume of product is achieved in relationship to the dough being employed.

Another object of the present invention is to provide an improved fried cake cooking method which requires a minimum of process control and dough property control and which efficiently produces cakes of uniform high quality, physical characteristics and appearance.

Still another object of the present invention is to provide a method of the above nature characterized by its reliability, flexibility, versatility and ease of operation.

In accordance with an illustrative embodiment demonstrating method aspects of the present invention, there is provided a process of cooking a shaped piece of heat expandable dough which comprises the steps of totally immersing said piece in an edible frying medium at a frying temperature wherein said medium is a liquid and for a time sufficient to assure proper shaping of said piece, thereafter partially immersing said piece in said frying medium to form the corresponding immersed portion into a non-expandable crust serving as an in situ cooking vessel for said piece and leaving the remaining exposed portion in condition for expansion upon heating and subjecting said exposed portion to microwave energy of an intensity and for a duration to heat said piece for expanding the same until uniform density is obtained throughout the internal crumb portion and for at least partially cooking the same to set this structure while being contained by said non-expandable crust. Preferably, the partially cooked dough piece is then inverted to subject the expanded exposed portion to the frying medium to complete the cooking.

The above and other objects of the present invention will become apparent from a reading of the following description taken in conjunction with the accompanying drawing, wherein:

FIG. 1 is an exploded perspective, part fragmentary, view of an apparatus embodying the present invention;

FIG. 2 is a vertical longitudinal sectional view thereof;

FIG. 3 is a sectional view taken along line 3—3 of FIG. 2;

FIG. 4 is a sectional view taken along line 4—4 of FIG. 2; and

FIG. 5 is a sectional view taken along line 5—5 of FIG. 2.

In a sense, the present invention contemplates the provision of a method of producing a cooked product comprising the external application of heat to a side of an extruded piece of heat expandable dough to form a crust thereon while leaving another side thereof in a substantially uncrusted state and subjecting said partially cooked piece of dough to a high frequency electromagnetic field to heat said dough internally and effect the expansion thereof. The present improved method is advantageously practiced by employing a dough batter containing a chemical leavening agent and by forming and extruding dough rings thereof directly above a cooking vessel containing a hot cooking oil at a point trailing the zone to which the high frequency field is confined. The vessel is provided with a conveyor for continuously advancing the dough pieces from a trailing to a leading section, the high frequency field being confined to an intermediate section and means are provided for turning the dough pieces following the high frequency zone to deposit them in the leading section in an inverted state. Confining the high frequency or microwave field to the intermediate section of the conveyor assures the proper shaping of the dough through the formation of the shape-retention skin in advance of subjecting the then partially immersed dough to the microwave field. The cooking oil is maintained at a temperature ranging between 300° F. and 400° F. and advantageously between 350° F. and 375° F. The dough piece is disposed in the trailing or partial crusting section for a period between 1 and 20 seconds, advantageously between 6 and 15 seconds to assure shaping by the formation of a shape-retention skin before it is completely positioned in the high frequency zone wherein the dough piece is partially submerged with its upper portion in an expandable state and its lower submerged portion in a crusted substantially unexpandable state, such condition permitting the desired expansion and shaping of the dough piece in an optimum manner. The dough piece, in the high frequency field hereinafter set forth, that is, for example, a frequency of 2,450 megacycles per second at a power of 1.6 kilowatts, is advantageously exposed to the high frequency field for a period of between 10 and 25 seconds, preferably between 15 and 20 seconds, and is removed from the high frequency zone and inverted in the hot oil in the leading zone where the cooking of the inverted piece of dough in the hot oil is completed for a period between 20 and 40 seconds, advantageously between 25 and 35 seconds. The dough piece, to advantage, may also be exposed to the high frequency field following the inversion of the expanded dough piece in the hot oil in the leading zone, for at least part of its presence in the leading zone. As an alternative, the dough piece may be expanded and its cooking completed while exposed to the high frequency field and without inversion by exposing the floating dough piece to the high frequency field for a period advantageously between 20 and 55 seconds and preferably between 30 and 40 seconds. During this latter period, it has been observed that the oil appears to be pumped over the upper face of the dough piece eventually to effect the cooking and crusting thereof following its expansion. The frequency of the electromagnetic field is that normally employed in dielectric heating, for example, between 915 and 2,450 megacycles per second and its intensity and the time of exposure of the dough piece is sufficient to effect the desired expansion of the dough and can be readily determined by one skilled in the art, it being noted that the expansion of the dough piece in the high frequency field is a function of the frequency and intensity of the field and the time of exposure thereto.

Apparatus for practicing the present method includes an elongated vessel containing a cooking oil and means for heating the oil to a predetermined temperature. There are located in the cooking vessel conveying means for advancing the dough pieces and which include longitudinally spaced transversely extending flights, and dough piece inverting means including rotating paddles positioned between the ends of the conveyor. A preforated cage defining a high frequency compartment encloses at least an intermediate section of the cooking vessel trailing the inverting means and confined passageways extend forwardly and rearwardly of the compartment, the high frequency field being highly attenuated in these passageways. The trailing passageway is provided with a top opening at its trailing end with which registers the nozzle of a conventional dough ring forming extruding and cutting device. A high frequency generator is positioned in the compartment and is connected to a suitable energy source.

Referring now to the drawings, reference numeral 10 generally designates apparatus for practicing this new process which comprises an open topped elongated tank or cooking vessel 11, a dough piece conveyor and flipper assembly 12, a high frequency radiation confining housing or cage 13 and a high frequency generator assembly 14. Tank 11 is formed of any suitable metal and is of rectangular configuration including a bottom wall 16, end walls 17, and front and rear walls 18.

A heating element 19, in the form of a metal sheathed resistance heater, is disposed in tank 11 and extends along bottom wall 16 and is provided with end legs 20 extending upwardly along front wall 18 to a power controlling and temperature regulating box 21 (see FIG. 1). Control box 21 is of conventional construction, controlling the electrical energization of the heating element 19 in response to a thermostatic device to regulate the temperature of the cooking oil in tank 11 to an adjustable predetermined frying temperature. The control box 21 is positioned forwardly of front wall 18 and is suitably mounted and is connected to the heating element end legs 20 by short arms 22. Supported in tank 11 immediately above heating element 19 and of a width somewhat less than that of bottom wall 16 is a rectangular grid 23 (see FIG. 2), provided at opposite ends with transversely extending depending flanges 24 which rest on the end borders of the bottom wall 16 to removably support grid 23. A transversely extending arcuate channel 26 is formed in grid 23 between the ends thereof.

The conveyor and flipper assembly 12 comprises a support frame 27 which removably rests in tank 11 and includes front and rear similar panels 28 and 29 respectively, which are parallel and adjacent to front and rear walls 18 of the tank. Each panel 28 and 29 includes a leading upper corner 25 of small rectangular section which substantially rests on the upper edge of the leading end wall 17 of the tank, the main rectangular section 30 having legs resting on tank bottom 16, with a leading edge thereof contiguous to the tank leading end wall 17, and a trailing edge contiguous to the tank trailing end wall 17, and a top edge shortly above that of tank 11.

A horizontal drop plate 33 (see FIGS. 2 and 5) extends transversely between and is secured to opposite trailing ends of main sections 30 between the top and bottom edges thereof, and an upwardly forwardly inclined discharge ramp plate 34 is located between and is secured to the upper leading parts of plates 28 and 29 and terminates at the leading sections 25.

Journalled in and extending between plates 28 and 29 are transversely extending parallel leading, intermediate and trailing shafts 36, 37 and 38, respectively, shafts 36 and 38 being disposed just below the level of drop plate 33, trailing shaft 38 being located below the trailing edge of drop plate 33, and intermediate shaft 37 being above the level of shafts 36 and 38. Affixed to shafts 36 and 38 are pairs of similar sprocket wheels 39 which are spaced inwardly of the confronting faces of plates 28 and 29, and affixed to the shaft 37 are sprocket wheels 40 which are smaller than sprocket wheels 39 and are likewise spaced inwardly of support plates 28 and 29. A pair of transversely spaced parallel, longitudinal sprocket chains 41 are supported by and between corresponding sprocket wheels 39 and engage the upper teeth of sprocket wheels 40.

Supported by and between and depending from sprocket chains 41 are regularly longitudinally spaced parallel transversely extending flights 42 which are advanced by sprocket chains 41 from the trailing sprocket wheels 39 along the upper face of drop plate 33, to the leading sprocket wheels 39 and then under, around and back to and around trailing sprocket wheels 39. A pair of perforated transversely extending flipping paddles 43 are affixed to and project radially oppositely from intermediate shaft 37 which is coaxial with arculate channel 26, each paddle 43 being of somewhat less depth than the distance between successive flights 42, and being provided along its inner edge with a flange 44 projecting in the direction of rotation of the paddles 43. Sprocket wheels 39 and 40 are so dimensioned and related that with each increment advance of a flight 42 for a distance equal to that between successive flights 42, shaft 37 rotates 180° and the trailing flipping paddle 43 receives a dough piece located in a pocket or cell between a pair of adjacent flights 42 and inverts the dough piece and deposits it into the advancing pocket. It should be noted that the level of the cooking oil in the tank 12 is above that of the drop plate 33 preferably by an amount about that of the height of the dough ring being cooked and at about the level of or slightly below the upper sections of flights 42. A gear 46 is affixed to the rear end of the leading shaft 36.

A lower transversely extending shaft 47 is disposed below and trails the trailing edge of ramp plate 34 and an upper transverse shaft 48 is disposed adjacent to and in advance of the leading upper edge of ramp plate 34. Shafts 47 and 48 are journalled to and between support plates 28 and 29 and a plurality of axially spaced sprocket wheels 49 are affixed to each of shafts 47 and 48, said sprocket wheels being longitudinally aligned. A sprocket chain 50 extends between and about each pair of longitudinally aligned sprocket wheels 49 and extends along the upper face of ramp plate 34, the trailing edges of the sprocket chains being shortly forward of the leading end run of flights 42. A gear 51 is affixed to the rear end of shaft 47 and is coupled to gear 46 by a sprocket chain 52. Drive shaft 48 is driven in any suitable manner, such as by a suitably mounted adjustable speed drive motor 53 connected to shaft 48. Motor 53 is driven to advance sprocket chains 50 and flights 42 along their upper runs. Sprocket wheels 49 on upper shaft 48 are disposed directly above the upper edge of the tank leading end wall 17 so that the conveyor defined by the sprocket chains 50 discharges over the upper edge of leading end wall 17.

The cage 13 functions to direct and confine the high frequency radiation from generator assembly 14 to a predetermined area of cooking tank 11, specifically between flipper shaft 37 and a section trailing shaft 38 or alternatively between shaft 36 and said trailing section, and to minimize external radiation. Cage 13 is formed of a perforated metal, the openings being large enough to permit the circulation of air therethrough but sufficiently small to prevent the passage of the high frequency heating radiation, and includes a lower main section 54 which engages and houses cooking tank 11, a discharge section 56 forward of and extending above main section 54, an intermediate section 57 affording communication between the upper adjacent parts of sections 54 and 56, and a high frequency coupling section 58 extending above main section 54.

Main section 54 comprises a rectangular top wall 59 of substantially the corresponding horizontal dimensions of cooking tank 11, depending front and rear walls 60 and 61 and vertical leading and trailing end walls 63 and 64, respectively. Cage walls 60, 61, 63 and 64 extend substantially to the bottom of cooking tank 11 and engage the outside faces of the corresponding walls thereof and the cage top wall 59 is disposed above the cooking tank 11 at about or slightly above the level of the upper edges of support plate sections 30. Formed in the trailing border of the cage top wall 59, intermediate its front and rear edges is a circular dough piece feed port 65 provided with an upstanding peripheral flange 66. A dough ring extruding and cutting device 67 of conventional construction coaxially registers with the port 65 and is synchronized with conveyor flights 42 in the known manner to drop a dough ring through port 65 into an underlying pocket between successive flights 42, during each increment advance of the flights 42.

A rectangular opening 68 is formed in the cage top wall 59 forward of feed port 65 and extends for a short distance less than the width of wall 59 and about to the leading end of the upper run of flights 42. Coupling section 58 is substantially hopper shaped, open at its top and bottom and registering with opening 68, and includes a vertical trailing wall 69 directed upwardly from the trailing edge of opening 68 and provided at its upper border with transversely projecting coplanar wings 70, and upwardly diverging front and rear walls 71, and a forwardly upwardly inclined leading wall 72 terminating in a transversely extending vertical flange 73. The upper edges of front and rear walls 71 are provided with outwardly directed horizontal flanges which terminate in upwardly directed flanges 74. The upper border of wall 69 and flanges 73 and 74 define a rectangular coupling frame 76. A removable perforated metal partition 77 is disposed in coupling section 58 and includes a panel 78 inclined rearwardly downwardly from the upper edge of the wall 72 and terminating in a depending skirt 79 disposed at about the level of the opening 68 and substantially intermediate its leading and trailing edges, partition 77 extending between side walls 71 and defining therewith and with the rear wall 69 a high frequency directing compartment 80.

Discharge section 56 includes a rectangular base wall 81 projecting forwardly of the bottom edge of wall 63 substantially coplanar with the bottom of the cooking tank 11 and is provided with vertical front and rear walls 82 extending upwardly from corresponding edges of base wall 81 to a level above that of main section top wall 59. The upper edges of the walls 82 are joined by a horizontal top wall 83 which extends rearwardly of wall 63 to a point shortly forward of wall 72 and is at a level above the upper ends of conveyor chains 50 to permit the discharge of dough pieces into the discharge section 56. The trailing section 84 of top wall 83 is of reduced width, and a vertical wall 86 depends from the trailing edge thereof to wall 59. Front and rear walls 87 extend between the corresponding edges of wall section 84 and wall 59 and are joined to front and rear walls 82 by vertical transverse panels 88 which extend between walls 59 and 83. A rectangular discharge opening 89 is formed in the leading part of wall 59 and is delineated by the lower edges of walls 86 and 87 and the upper edge of wall 63, communicating with cage section 56 through an opening 90 between the upper edge of wall 63 and wall 83, wall 83 being located some distance above the discharge end of conveyor chains 50. The front wall of cage section 56 is defined by a rectangular panel 91 hinged along its bottom edge to the leading edge of wall 81 and bearing at its upper border on a lip 92 depending from the leading edge of wall 83 thereby to permit access to cage section 56. It should be noted that suitable slots 93 are provided in the front wall 60 of the cage and in rear wall 87 to provide clearance for heater element arms 22 and shaft 48 respectively and to permit the driving of the latter.

The high frequency generator assembly 14 comprises a metal housing 94 which includes a rectangular base 96, peripheral vertical walls 97 which are secured to the edges of and project above and below base 96, and a top wall 98. One or more magnetron assemblies are mounted on base 96 and include the conventional arrangement of magnets and magnetrons 100, the output section of each magnetron 100 projecting through openings in base 96 into compartment 80. A blower 101 is associated with each magnetron 100 and circulates air around the magnetron 100 to effce the cooling thereof. Magnetrons 100 are connected to a suitable source of energizing current in the known manner. Also mounted on base plate 96 is a drive motor 102 connected to a suitable source of power and including a vertical drive shaft 103 projecting through an opening in the base 96 and having affixed thereto a horizontal metal fan or stirrer 104, the blades of which move in a path directly below magnetrons 100. Fan 101 functions to circulate the air and to effect an improved high frequency field distribution in and through compartment 80.

Housing 94 is separably mounted on coupling section 58, base 96 being provided with depending peripheral flanges 106 which rest on the upper edges of flanges 73 and 74 and wall 69, and the lower borders of the housing peripheral walls 97 engaging the outer faces of flanges 73, 74, wings 70 and the upper border of wall 69.

In employing the apparatus described above in the practice of the present improved process as applied to the production of chemical leavened fried doughnuts, tank 10 is filled with a cooking material, which may be an oil, fat or the like, to a point at about the upper level of the advancing flights 42. The control box 21 is adjusted to the desired temperature to energize heating element 19, thereby to heat the oil to the adjusted regulated temperature. The apparatus is assembled as shown in the drawings and the magnetrons 100, blower 101, drive motor 53 and fan motor 102 are energized. Conveyor flights 42 and conveyor belts 50 are thus continuously advanced and the flippers 43 synchronously rotated, and a high frequency electromagnetic field is established in the compartment 80 and is directed into the tank 11 and confined to a zone therein defined substantially by the vertical projection of the area delineated by the lower edges of the partition flange 79, wall 69 and walls 71. The doughnut ring forming device 67 is actuated in synchronism with the advancing flights 63 to drop a dough ring through port 65 into successive pockets between flights 42. The presence of plate 33 prevents the fresh dough ring from dropping to the bottom of tank 11 and plate 33 is so positioned in relation to the level of the fat such that the entire dough ring is totally immersed for a period sufficient to form the shape-retention skin before it becomes buoyant. Thereafter, a substantially non-expandable crust is formed on the underface of the dough ring as it is advanced by flights 42, with the dough ring floating in the fat. During the initial advance of the floating dough ring, relatively little expansion is effected. However, as the floating dough ring is advanced to the high frequency zone, as defined above, it is rapidly internally heated by the microwave energy and the full expansion of the dough ring is achieved in a highly superior and desirable manner, the crusting of the underface of the dough ring effecting an important contribution to the proper control of such expansion. Upon the dough ring reaching the turning paddle 43, it has reached substantially its full expansion as effected by the high frequency field and is then inverted and partially submerged in the oil to form a crust on the side previously uppermost, and hence complete the doughnut cooking cycle. The cooked doughnut is advanced by a flight 42 onto the conveyor chains 50 where it is carried from the tank 10 and discharged over the edge thereof into a tray which may be housed in the discharge section 56. The filled tray may be removed from the discharge section 56 through the end thereof by opening the door 91.

The temperature of the hot cooking oil, the frying time of the submerged lower portion of the doughnut prior to the high frequency heating thereof and the high frequency heating time depend on the composition of the dough or batter and the desired end product and are advantageously within the ranges set forth above. The frying and exposure times may be adjusted by adjusting the speed of the drive shaft 48 either by way of motor 53 or otherwise.

As described earlier, the piece of dough may be completely fried on both sides without necessitating the turning thereof. According to this latter practice, the paddles 43 are removed and the partition 77 is advantageously likewise removed. The dough pieces, as they are advanced by the flights 42, first have expansion restricting crusts formed on their underfaces and are then exposed to the high frequency field. It has been observed that the hot oil is pumped and flows over the upper faces of the dough pieces exposed to the high frequency field. However, before any restrictive crust is formed on the dough piece top face, the dough piece fully expands and by the time the dough piece leaves the high frequency field zone, the upper face thereof is fully fried and crusted by the pumped hot oil.

As one specific example of the present process, a batter of the following composition was produced in the conventional manner:

|   | Parts |
|---|---|
| Water | 30.0 |
| Wheat flour | 42.0 |
| Sucrose | 16.0 |
| Shortening | 4.0 |
| Skim milk solids | 3.5 |
| Yolk solids | 1.5 |
| Chemical leavening | 1.3 |
| Dextrose | 1.0 |
| Salt | 0.7 |

The cooking oil was regulated to a temperature of from 350° F. to 375° F. and rings of the batter were formed by the extruding and cutting device 67 and dropped through port 65 into successive advancing cells or pockets. The advancing rate of the flights 32 was adjusted so that the dough rings were in the cooking oil 10 to 15 seconds to assure proper shaping before entering the high frequency field zone and they were exposed to the high frequency electromagnetic field for from 10 to 20 seconds. The electromagnetic field had a wave length of 12.3 centimeters and the magnetrons 100 delivered 1.6 kilowatts of power. It should be noted that a radiation confining, swingable metal flap may depend from the lower edge of the wall 69 into the oil in the tank 11. The dough piece was then flipped from the high frequency zone and its opposite face fried for a period of about 20 to 40 seconds and then discharged.

The product obtained was a fully cooked and crusted doughnut having a specific volume greater than 3.6 cc./gram. The cooking process took from 50 to 70 seconds, which is approximately one-half to two-thirds of the conventional cooking time.

It is critical under the above conditions to the achievement of optimum production of the subject product by the present cooking method that the application of the microwave high-frequency electromagnetic energy occur 6 to 15 seconds after the dough enters the frying fat to assure the formation of the shape-retention skin of a strength sufficient to appropriately control expansion when the dough piece is subsequently exposed to the microwave energy. If this time element is not observed, the product will not shape properly.

Optimum results are obtained for the present formulation when the frying fat temperature is held between 350° F. and 375° F. At higher temperatures, the rise time is too fast to permit enough skin formation on the second side of the doughnut and misshaping occurs when microwave electromagnetic energy is applied. At lower temperatures, browning and crusting are insufficient. On the other hand, a doughnut formulation as described above but containing one-quarter less chemical leavening is cooked to optimum quality in frying fat kept between 350° F. and 365° F.

In accordance with another example of the present process, the batter composition described above was employed with the addition of up to 2.0 parts of glycine, lycine or glucosamine or a combination thereof, preferably between 0.5 part and 1.5 parts. The partition 77 and the flippers 43 were removed and the cooking oil was adjusted to a temperature of 350° F. to 375° F. Dough rings were dropped into the kettle through port 65 and were fried while advancing for 6 to 15 seconds before they enter the high frequency zone as delineated by the full opening 68. The dough pieces were exposed to the high frequency field while being advanced for a period of 30 to 40 seconds where they expanded, fully cooked and crusted, and were then discharged by conveyor chains 50.

It will be noted that in the last described method of cooking the doughnut, it was not turned over in the fat but was cooked and crusted on both sides by a surprising and completely unexpected phenomenon. The phenomenon is characterized by a fountain effect in which the cooking oil is pumped up through the hole in the doughnut and cascades back down over the entire top surface so that the entire doughnut is enveloped in hot fat in the high frequency field. It has been found that by adding amino acids or Maillard intermediates sufficient coloring of the second side of the doughnut can be obtained to minimize the difference in color between the two sides that results from one side being submerged in fat for a longer period of time and subjected to a higher temperature since the fat pumped up and over the doughnut is somewhat cooled in the process.

The present processes are particularly useful in producing fried cake products which are light and fluffy and are characterized by an extremely low uniform crumb density, as described in application Ser. No. 34,905, filed on May 5, 1970 and entitled "Improved Fried Cake Products." As described in said copending application, it is believed that the widespread acceptance of the blooming doughnut is related to its lightness or fluffiness as compared to other fried cake products. However, although a variety of formulations and techniques have been tried in the baking and cooking of such blooming doughnuts, it was not heretofore feasible to formulate a commercially acceptable fried product having a crumb density on a fat-free, moisture-free basis of less than 0.160 gram per cubic centimeter (gms./cc.). Further, typical prior art cake products characteristically had a non-uniform crumb density when viewed in cross section and particularly exhibited a thickened area or higher density core within their internal structures. The presence of such thickened core within the product is disadvantageous since it leads to shorter shelf life due to more rapid staling of the core section and also is undesirable in that it produces a non-uniform eating characteristic. With the instant processes, there are produced fried cake products including blooming doughnuts having greatly enhanced properties including substantially uniform crumb density through a typical cross section, improved physical properties and eating characteristics.

Fried cake products produced in accordance with the present invention are readily distinguished from the prior art products by virtue of their low, uniform densities. Thus, an examination of the cross-sectional area of products produced with this process reveals the absence of the core which is characteristic of prior art fried cake products. Moreover, the density of the products produced by the present process, on a fat-free, moisture-free basis, are within the range of 0.121 to 0.155 grams/cc., which is significantly lower than the density of typical prior art cakes. Substantial reduction in the density of the present products also results in substantial savings in the manufacture of fried cakes. As is generally understood, the size of doughnuts has been substantially standardized by selection of the size and shape of manufacturing equipment and the related packaging equipment which produces the ultimate consumer product. With the present processes, it is possible for the manufacturer to produce a fried cake product of the desired volume or size and yet realize a reduction in the weight or amount of dough required to achieve such size. This saving in dough is made possible by the significantly lower densities and corresponding higher volume per unit weight achieved in accordance with the present processes.

The present processes may be practiced to produce low-density coreless fried cake products from a wide variety of conventional chemically leavened dough-forming mixes. A typical formulation may include the following ingredients in the following ranges:

| | Broad range, parts | Preferred range, parts |
|---|---|---|
| Wheat flour | 52-65 | 58-60 |
| Sugar | 20-30 | 24-26 |
| Shortening | 3.0-7.0 | 4-5 |
| Non-fat milk solids | 1.0-6.0 | 3-5 |
| Egg yolk solids | 0.5-3.0 | 1-2 |
| Chemical leavening acids | 0.75-1.5 | 1.0-1.3 |
| Soda | 0.6-1.0 | 0.8-0.9 |
| Salt | 0.7-1.1 | 0.8-0.9 |

A dough composition is formulated from the above ingredients by mixing 100 parts of a mixture of these ingredients with 40 to 50 parts of water.

The specific ingredients employed in the above composition are generally not critical and a wide variety of wheat flours, sugars, shortenings and salt may be employed. Thus, for example, the composition may be formulated with dextrose lactose, sucrose or combinations thereof. In addition, a wide variety of natural and artificial flavors, coloring and seasonings or other conventional dough ingredients may be present in minor amounts. The selection of a chemical leavening agent is also not critical and any conventional leavening agent may be employed, for example, glucono delta lactone or phosphoric acid derivatives such as mono-calcium phosphate and sodium acid pyrophosphate, either alone or in combination.

The low-density coreless fried cake products produced in accordance with the present process are further characterized by a higher moisture content than conventional fried cake products. Although it is desirable to increase the moisture content of a fried cake product in order to improve its eating qualities and reduce its cost, such increases have heretofore been avoided since they result in dissolution and deterioration of the sugar coatings which are often applied to such cake products and in addition, high moisture conditions favor the growth of mold. Processing in accordance with the present invention overcomes the disadvantages of the prior art since it provides a higher weight percentage of water in the range of 22 to 27 wt. per cent of the total weight of fried cake product. This result is achieved by virtue of the reduction in the density of the present products which permits a lower total weight of water to account for a higher weight percentage of the total product. Thus, the present fried cake products will result in less dissolution of sugar coatings and yet at the same time provide sufficient moisture for optimum eating qualities. In addition, it has been found that doughnuts made according to this invention do not mold as fast as doughnuts made by conventional methods.

The fried cake products produced in accordance with the present invention are also characterized by an increase in the ratio of fat to solids which enhances the eating qualities of the product. This enhancement is obtained without adding to the cost of the product since the overall rate of fat absorption is comparable to a conventional fried cake product of similar volume. However, due to the reduced weight of the present product, the ratio of fat to solids is increased, resulting in products containing 13 to 21 wt. percent fat.

A typical example for practicing the present invention is as follows:

A dough composition for automatic extrusion is prepared in the conventional manner from the following ingredients: 30.0 parts water; 42.0 parts wheat flour; 16.0 parts sucrose; 4.0 parts shortening; 3.5 parts non-fat milk solids; 1.5 parts yolk solids; 1.3 parts chemical leavening; 1.0 part dextrose and 0.7 part salt. The dough has a viscosity in the range of 60 to 150 Brabender units, preferably approximately 100 Brabender units (as compared to a hand-cut dough which has a viscosity in the range of 200 to 400 Brabender units, preferably approximately 300 Brabender units). The viscosity of the dough was determined as follows: A Farinograph with large jacketed stainless steel bowl, kept at 30° C. by circulating water at this temperature through the jacket of the bowl was run at high speed until the torque dynamometer gave a stable reading (no more than a few seconds); thereafter, an aliquot of dough representing 300 grams of the dry mix composition that has been mixed in the conventional manner with water preparatory to making a doughnut run was transferred to the bowl quantitatively. The viscosity was taken as the reading 30 seconds after completing the transfer. Extruded machine cut rings of the dough composition at the rate of 40 dozen/hour were dropped into a hot cooking oil at a temperature of 350° F. to 375° F. and the dough was advanced through the cooking oil for 10 to 15 seconds. In the first 2 to 6 seconds, the dough pieces were totally submerged and were formed with a shape-retention skin; and for the balance of the time, the dough pieces were partially crusted and fried on one side. Thereafter, the partially-cooked dough pieces entered a high-frequency field zone where they were exposed to an electromagnetic field having a wave length of 12.3 centimeters and a frequency of 2450±50 mHz., with the magnetrons delivering 1.6 kilowatts of power for a period of 10 to 20 seconds. The dough piece was then flipped over and exited from the high-frequency field and its opposite face was fried for a period of about 20 to 40 seconds. The product obtained from this process is a fully-cooked and crusted doughnut having a crumb of uniform cross-sectional density.

The finished doughnuts were allowed to cool for 45 minutes subsequent to frying and thereafter, the densities of the fried cake products were determined. The density was measured by placing 4 to 6 doughnuts in the sample compartment of a "National Loaf Volumemeter" and the displacement volume was determined as directed by the manufacturer's instruction sheet for this apparatus. Thereafter, the doughnuts were weighed and found to weight 12.7 ounces/dozen (360.0 grams/dozen). These doughnuts had a displacement volume of 1342.5 cubic centimeters and filled a conventional box which would normally be filled by doughnuts weighing 15 ounces/dozen.

Moisture and fat content were determined by modifications of methods 13.002 and 22.033 of the Methods of Analysis of the Association of Official Agricultural Chemists, 9th Edition, 1960, and the doughnuts of this example were found to contain 23.2 wt. percent water and 18.9 wt. percent fat and the fat-free, moisture-free solids content of the doughnut was 208.5 grams/dozen. Thus, the density of the doughnuts was 208.5/1342.5 or 0.155 gram/cubic centimeters.

Several doughnts prepared in the above manner were cut at various points in order to determine the crumb structure of a typical cross-section, i.e., the structure in that part of the doughnut encased by the outer skin or crust of the doughnut. The visual inspection revealed that each doughnut had a uniform density across its entire cross-section and there was no visible indication of a core area or area of higher density. The entire crumb structure was uniformly open and irregular.

A latitude of modificaiton, change and substitution is intended in the foregoing disclosure, and in some instances some features of the ivention will be employed without a corresponding use of other features. Accordingly, it is appropriate that the appended claims be construed broadly and in a manner consistent with the spirit and scope of the present invention.

We claim:

1. The method of cooking a shaped piece of heat-expandable dough comprising the steps of dropping said piece into an edible frying medium to totally immerse the same therein, said edible frying medium being at a frying temperature wherein said medium is a liquid and the total immersion of said piece being for a time sufficient to form a shape-retention skin on said piece, said piece becoming buoyant after a period of total immersion due to the partial expansion thereof such that said piece floats to the surface of said frying medium with a lower portion thereof remaining immersed in said frying medium and an upper portion thereof being exposed above the surface of said frying medium, maintaining the immersed portion of said piece in said frying medium for a time sufficient to form into a non-expandable crust thereon serving as an in situ cooking vessel for said piece and leaving the remaining exposed portion of said skin in condition for expansion upon heating, subjecting said exposed portion of said piece to microwave energy of an intensity and for a duration to heat said piece for expanding and for at least partially cooking the same while being contained by said shape-retention skin and said non-expandable crust, removing said piece from exposure to said microwave energy source and forming a crust on said exposed and expanded portion of said piece to provide a substantially uniform external appearance.

2. The method according to claim 1 wherein the frying medium is at a temperature of between 300° F. and 400° F.

3. The method of claim 1 wherein the exposed portion of said piece is not subjected to microwave energy for at least 1 to 20 seconds after the total immersion of said piece in said frying medium.

4. The method according to claim 1 including the steps of turning said piece and immersing the exposed and expanded portion thereof in said frying medium to form said crust.

5. The method of claim 1 wherein the intensity and duration of said microwave energy is sufficient to effect the pumping of said frying medium over the exposed and expanded portion of said piece to form said crust on said exposed and expanded portion.

6. The method of claim 1 wherein said piece of dough contains a chemical leavening agent.

7. The method of claim 1 wherein the intensity and duration of said microwave energy is sufficient to effect the pumping of said frying medium over the exposed and expanded portion of said piece to form said crust on said exposed and expanded portion.

8. The method of claim 1 wherein said piece of dough contains a chemical leavening agent.

9. The method of cooking a shaped piece of heat-expandable dough comprising the steps of dropping said piece into an edible frying medium to totally immerse the same therein, said edible frying medium being at a frying temperature wherein said medium is a liquid and the total immersion of said piece being for a time sufficient to form a shape-retention skin on said piece, said piece becoming buoyant after a period of total immersion due to the partial expansion thereof such that said piece floats to the surface of said frying medium with a lower portion thereof remaining immersed in said frying medium and an upper portion thereof being exposed above the surface of said frying medium, thereafter continuing to subject said lower portion of said piece to said frying medium to form a non-expandable crust on said lower portion of said piece while concurrently subjecting said piece to microwave energy, said microwave energy being of an intensity and for a duration to heat said piece to expand and to at least partially cook the exposed upper portion thereof concurrent with the formation of said non-expandable crust on said lower portion of said piece, removing said piece from exposure to said microwave energy and forming a crust on said exposed and expanded portion of said piece to provide a substantially uniform external appearance.

10. The method according to claim 9 wherein the frying medium is at a temperature of between 300° F. and 400° F.

11. The method of claim 9 wherein the exposed portion of said piece is not subjected to microwave energy for at least 1 to 20 seconds after the total immersion of said piece in said frying medium.

12. The method according to claim 9 including the steps of turning said piece and immersing the exposed and expanded portion thereof in said frying medium to form said crust.

13. The method of forming and cooking chemically leavened doughnuts comprising the steps of extruding a shaped dough piece from a heat-expandable and chemically leavened dough batch, dropping said piece into an edible and liquid frying medium maintained at a frying temperature for a total immersion period sufficient to form a shape-retention skin on said piece, said piece becoming buoyant after a period of total immersion due to the partial expansion thereof such that said piece floats to the surface of said frying medium with a lower portion thereof remaining immersed below said surface and an upper portion of said piece being exposed above said surface, thereafter maintaining said lower portion of said piece in said frying medium for a time sufficient to form a non-expandable crust thereon while subjecting said piece to microwave energy of an intensity and for a duration to heat said piece for expanding and at least partially cooking said exposed upper portion of said piece concurrent with the formation of said non-expandable crust on the lower portion thereof removing said piece from exposure to said microwave energy and immersing the upper portion thereof in said frying medium to form a complete non-expandable crust on said piece.

14. The method according to claim 13 wherein the viscosity of said dough batch is in the range of 60 to 150 Brabender units.

15. The method according to claim 13 wherein the frying medium is at a temperature of 300° to 400° F. and the exposed portion of said piece is not subjected to microwave energy for at least 1 to 20 seconds after the total immersion of said piece in said frying medium.

References Cited
UNITED STATES PATENTS 2,997,566    8/1961    Pierce et al. _____ 99—10 UX
3,479,188    11/1969    Thelen _____ 99—86

RAYMOND N. JONES, Primary Examiner

U.S. Cl. X.R.

99—92